UNITED STATES PATENT OFFICE.

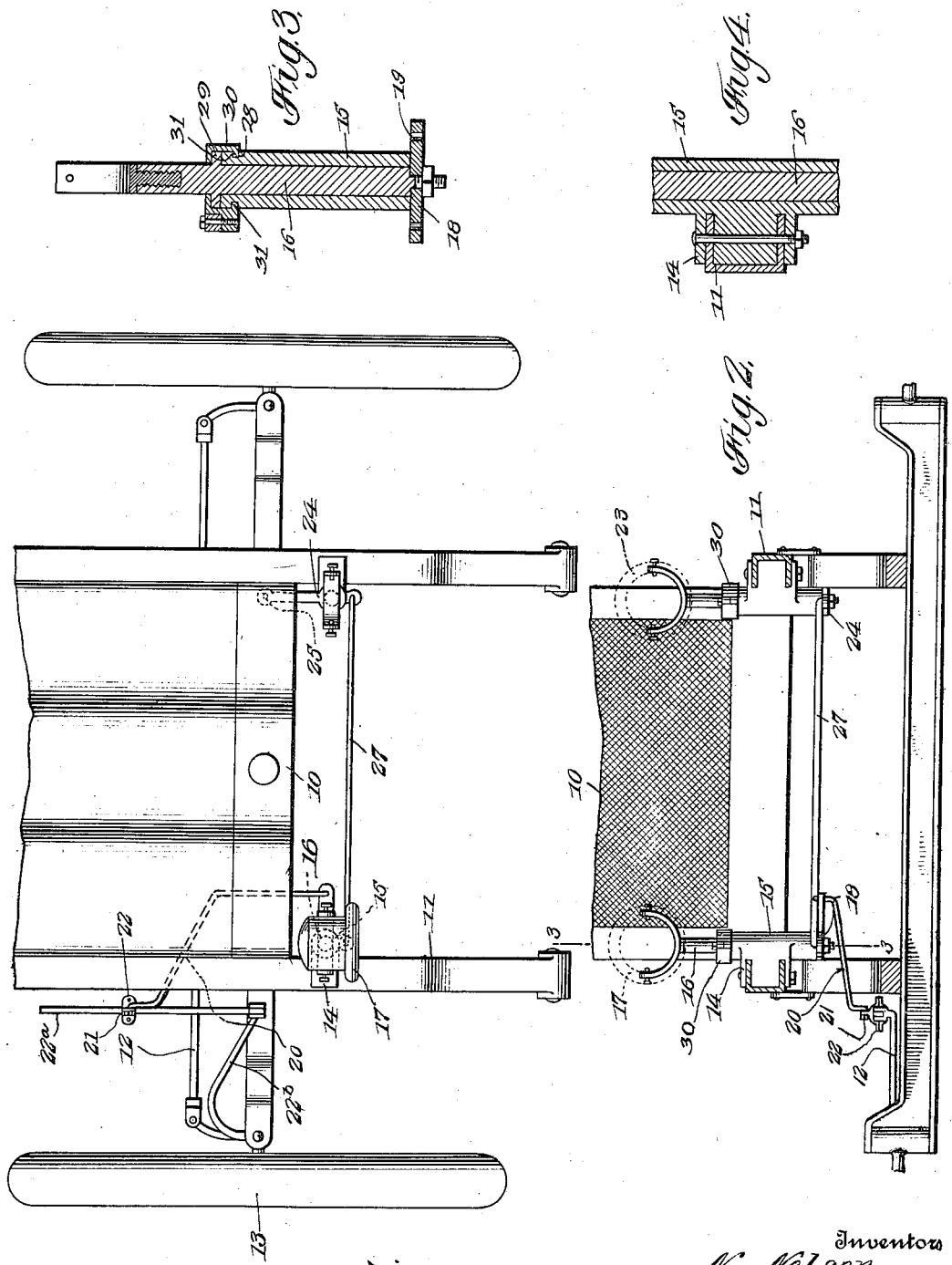

NELS NELSON AND RICHARD ELLIOTT, OF FORT DODGE, IOWA.

SEARCH-LIGHT.

1,193,813.   Specification of Letters Patent.   Patented Aug. 8, 1916.

Application filed April 9, 1915. Serial No. 20,251.

*To all whom it may concern:*

Be it known that we, NELS NELSON and RICHARD ELLIOTT, citizens of the United States, residing at Fort Dodge, in the county of Webster and State of Iowa, have invented new and useful Improvements in Search-Lights, of which the following is a specification.

An object of the invention is to provide a search light preferably adapted for use on automobiles or other vehicles and in which the rays of light produced will swing or turn with the vehicle to light up the road or highway at a turn as the vehicle approaches the same.

The invention contemplates, among other features, the provision of a search light movably supported on the body of the vehicle and connecting with the steering gear thereof so that in negotiating a turn in the highway the light, falling upon the highway in advance of the vehicle, will fall around the turn therein as the vehicle negotiates the turn or curve.

Still further embodiments of the invention reside in a device consisting of few and simple parts that can be readily assembled and easily applied to various forms of vehicles.

In the further disclosure of the invention reference is to be had to the accompanying drawings, constituting a part of this specification, in which similar characters of reference denote corresponding parts in all the views, and in which:

Figure 1 is a fragmentary plan view showing the device applied to a vehicle; Fig. 2 is a fragmentary front elevation of the structure shown in Fig. 1; Fig. 3 is a vertical transverse sectional view taken on the line 3—3 in Fig. 2; and Fig. 4 is a vertical transverse sectional view showing the manner of connecting the lamp to the frame of the vehicle.

Referring more particularly to the views, we disclose a vehicle 10 having a frame 11 projecting forwardly beyond the body of the vehicle, said vehicle also having a steering mechanism 12, and by means of which the vehicle, through the medium of the front wheels 13, can be guided over the highway. Suitably bolted or otherwise secured to one side of the frame 11 at its front is a clamp 14, including a tubular bearing 15 through which extends a shank 16 of a lamp 17, thus supporting the lamp upon the bearing, whereby it can horizontally turn on said bearing. Suitably secured to the lower projecting end of the shank 16 is a plate 18 provided with a plurality of openings 19, said plate having one end of an arm 20 passing through one of the openings in the plate, the arm 20 having one end thereof bent at right angles to the other end thereof. The said other angular end of the arm 20 passes through and is connected with an ear 21 of a clamp 22 rigidly clamped to the steering mechanism 12. In order to secure the clamp 22 in proper relation to the steering mechanism the connection between the clamp and steering mechanism consists of a rod $22^a$ upon which the clamp 22 is secured, said rod $22^a$ at its forward end being secured to a curved arm $22^b$ which is in direct and rigid connection with the steering mechanism 12. Now it will be clearly seen that when the steering mechanism is actuated to turn the wheels 13 of the vehicle in a certain direction movement will be imparted to the lamp 17 through the medium of the arm 20 and its swinging connection with the plate 18 so that the lamp will be rotated in the bearing 15 in a direction corresponding to the direction of travel of the wheels of the vehicle.

A second lamp 23 is supported upon the other side of the frame 11 in the same manner as the lamp 17, said second lamp also carrying a plate 24 similar to the plate 18 and having a plurality of openings 25 therein. A connecting bar 27 of a substantially U-shaped construction passes loosely through the other opening 19 in the plate 18 and through one of the openings 25 in the plate 24 so that when the first mentioned lamp is actuated through the medium of the arm 20 connecting the steering mechanism with the first mentioned lamp, the connecting bar 27 having connection with the two lamps will result in a swinging of the second lamp in the same manner that the first lamp is swung and in a similar direction. It will be clearly seen that whereas on some vehicles the connection between the lamp and steering mechanism may be on the right it must necessarily on other vehicles be made upon the left side of the vehicle due to the fact that the steering mechanism is upon that side or for other similar reasons. Each bearing 15 which is of sleeve-like form for receiving the shank 16 is provided with an annular groove 28 near its upper end, while formed on the shank 16 is an annular shoulder 29 which is adapted to rest upon the said upper end of the bearing 15 and surrounding the sleeve 16 at the upper end thereof and the shoulder 29 is a separable sectional sleeve-like clamp 30 having flanges 31 for engaging the respective shoulder 29 on the stem 16 and in the groove 28 in the sleeve 15 for rotatably locking the stem 16 in the said sleeve. To this end, if it is desired to arrange the connection between the lamp and steering mechanism on the opposite side or end of the steering mechanism, the arm 20 is disconnected from the first mentioned lamp and the steering mechanism and connected to the opposite side of the steering mechanism to connect with the plate 24 by passing through the other opening 25 therein.

From the foregoing description it will be seen that the device described consists of few and simple parts which can be readily assembled and that the device can be quickly applied to vehicles, particularly automobiles.

Having thus described our invention, we claim:

A device of the class described comprising a sleeve constituting a bearing adapted to be secured to the frame of an automobile, a lamp bracket having a stem rotatably mounted in the said sleeve and formed with an annular shoulder resting upon the upper end of the sleeve, said sleeve being formed with an annular slot spaced from the upper end thereof, and a separable sectional sleeve-like clamp arranged concentrically of the sleeve and having flanges engaging the shoulder on the stem and in the groove in said sleeve for locking the stem of the fork rotatably mounted in the sleeve.

In testimony whereof we affix our signatures in presence of two witnesses.

N. NELSON.
RICHARD ELLIOTT.

Witnesses:
 Wm. S. Johnston,
 Edith S. Auel.